United States Patent [19]
Oehr

[11] 4,145,268
[45] Mar. 20, 1979

[54] METHOD OF CONDUCTING AN ELECTROLYSIS

[75] Inventor: Klaus H. Oehr, Surrey, Canada

[73] Assignee: British Columbia Research Council, Vancouver, Canada

[21] Appl. No.: 779,976

[22] Filed: Mar. 22, 1977

[51] Int. Cl.² .............................................. C02B 1/82
[52] U.S. Cl. ..................................... 204/149; 204/213
[58] Field of Search ....................... 204/149, 212–214, 204/222, 1 R, 130

[56] References Cited
U.S. PATENT DOCUMENTS

| | | | |
|---|---|---|---|
| 1,885,148 | 11/1932 | Smith | 204/214 |
| 2,390,282 | 12/1945 | Tour et al. | 204/213 |
| 3,645,867 | 2/1972 | Ericson et al. | 204/149 |
| 3,756,932 | 9/1973 | Zievers et al. | 204/149 |
| 4,014,757 | 3/1977 | Trechin | 204/222 X |
| 4,029,557 | 6/1977 | Christensen et al. | 204/149 |

*Primary Examiner*—Charles F. LeFevour
*Attorney, Agent, or Firm*—Townsend and Townsend

[57] ABSTRACT

A method of conducting an electrolysis is described. The method comprises tumbling an anode made up of a plurality of electrically conducting particles in an electrolyte while feeding a positive D.C. current to the particles. The current is fed via an anode feeder that is connected to a positive D.C. supply. A cathode is maintained in electrical contact with the electrolyte and is spaced from the anode. A negative direct current is applied to the cathode.

18 Claims, 5 Drawing Figures

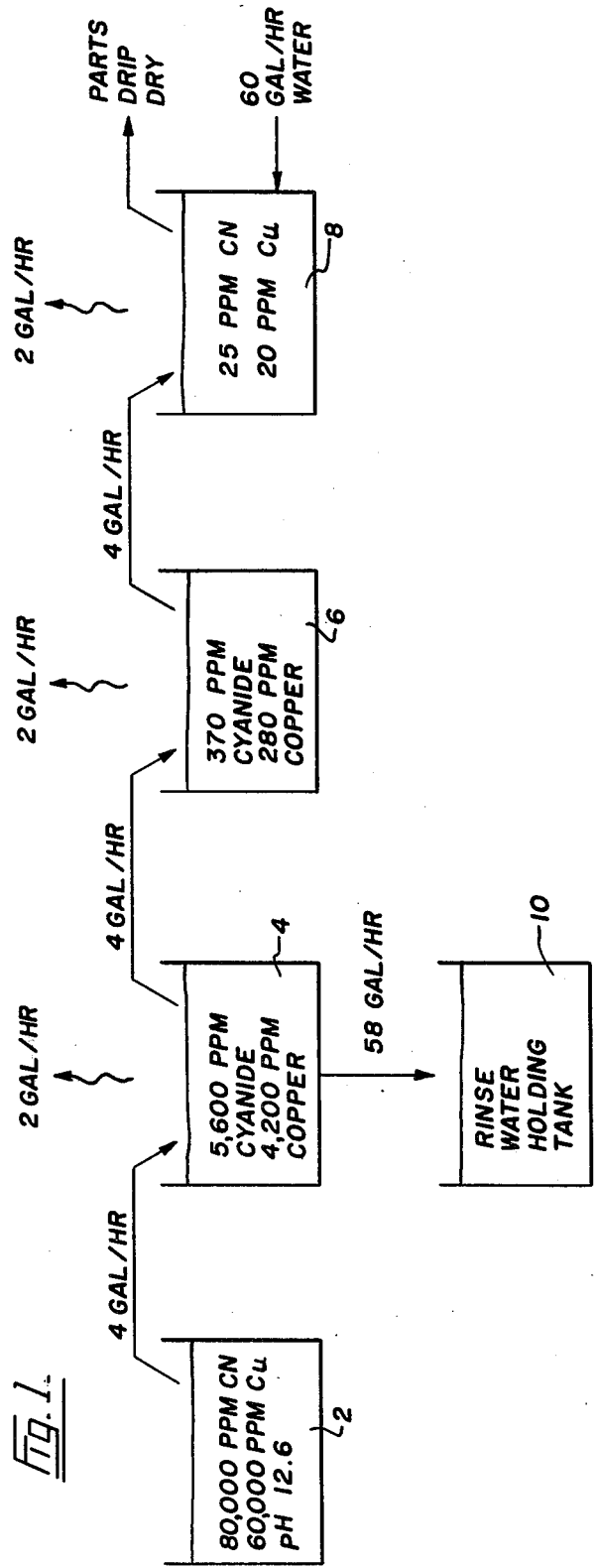

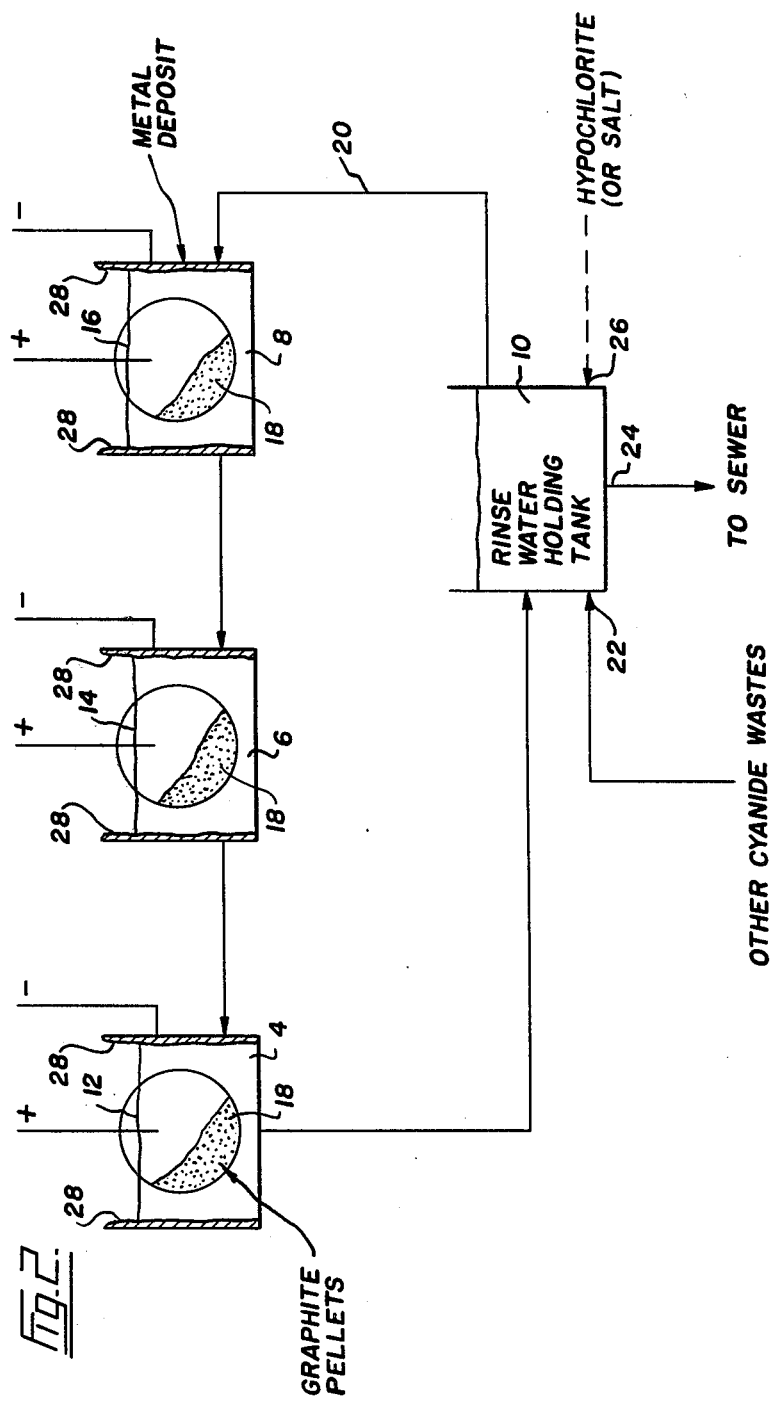

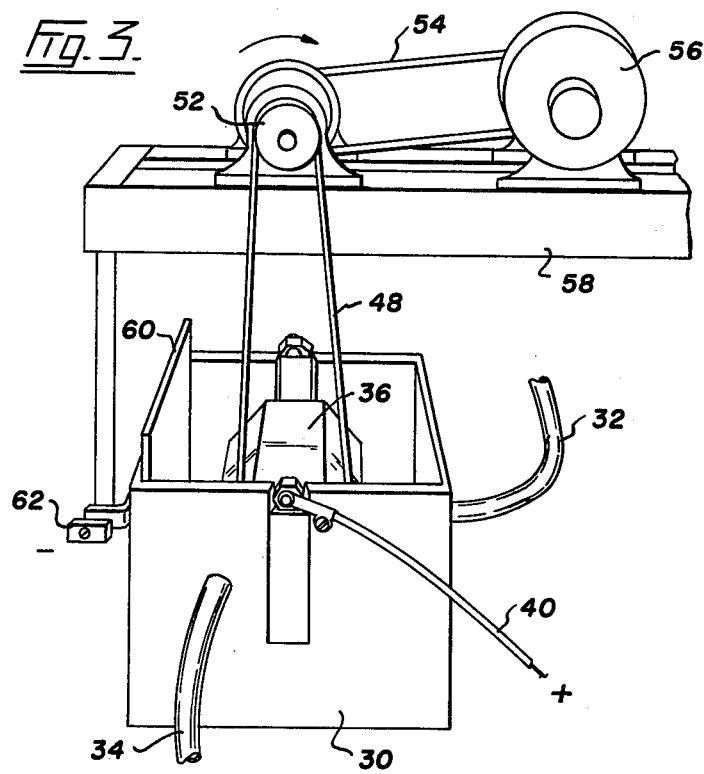
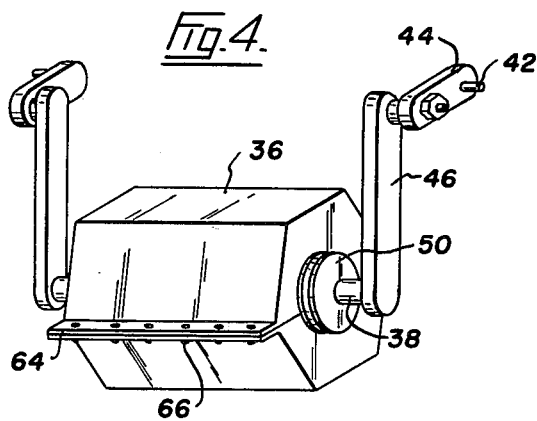

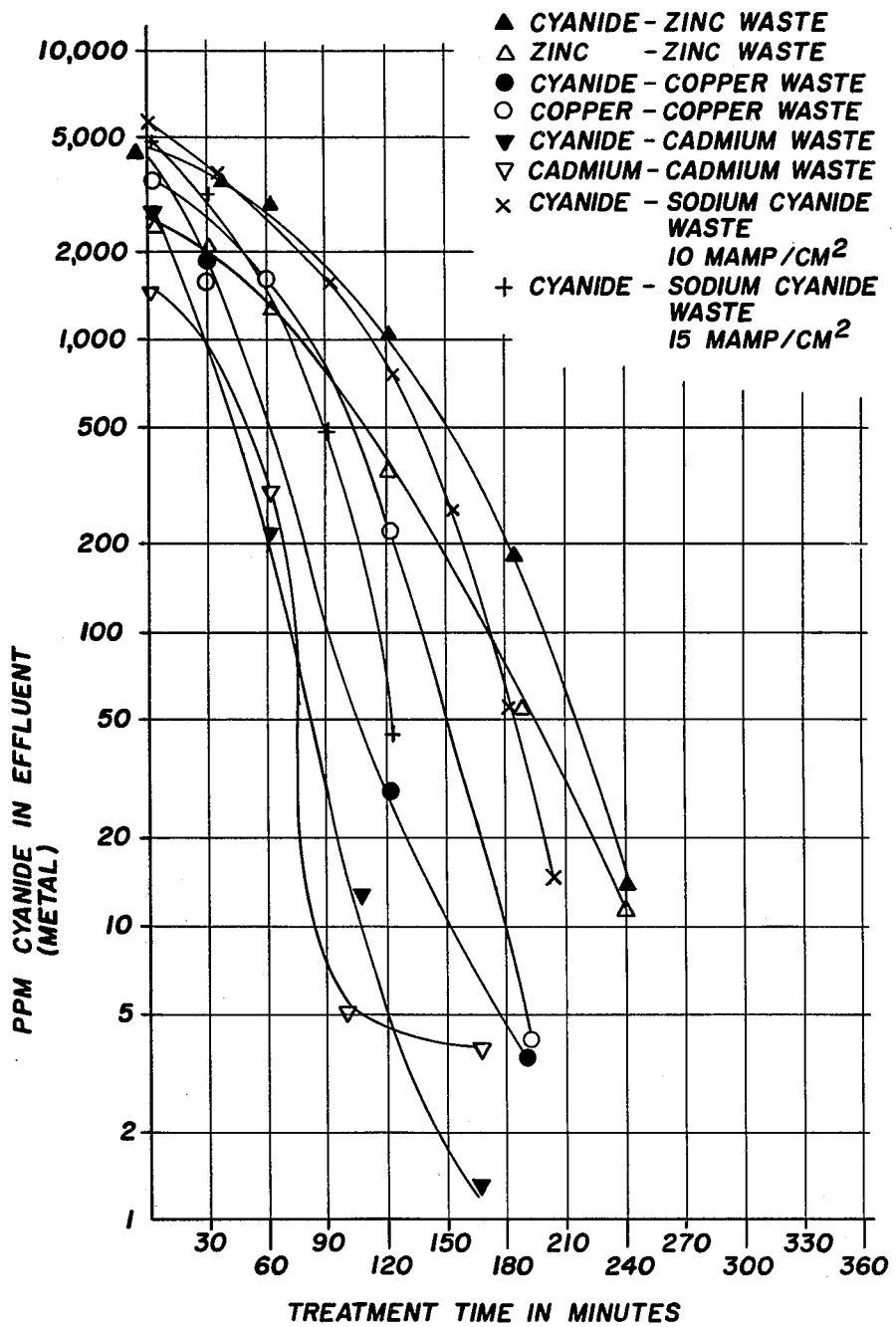

METHOD OF CONDUCTING AN ELECTROLYSIS

FIELD OF THE INVENTION

This invention relates to a novel method of conducting electrolysis. The method is of interest in destroying cyanide in cyanide-containing waste liquor and has particular application to the destruction of cyanide in electroplating solutions, particularly in the rinse water produced in a barrel electroplating system.

DESCRIPTION OF THE PRIOR ART

The acute toxicity of the cyanide ion is well known. It is clearly necessary that the cyanide ion be removed from industrial effluents before those effluents can be passed to water courses and sewage systems. There are, of course, laws governing the amount of cyanide ion and other toxic ions that may be contained in effluents. In 1962 the United States Public Health Service set 0.2 mg/liter of cyanide as a maximum allowable limit in potable water. The Ohio River Valley Sanitation Commission considers that a free cyanide content in excess of 0.025 mg/liter is unsafe for fish. Bacteria appear to have a higher tolerance to cyanide and sewage plants will generally take a higher concentration of cyanide than can be tolerated in water supporting fish life. Figures have indicated that an upper limit of 2 mg per liter of cyanide is acceptable for anaerobic sludge digestion without upsetting the bacteria in the sludge treatment tank.

Generally speaking cyanide concentration in effluents may be controlled by:
1. Dilution
2. Chemical Treatment
3. Electrolytic Treatment and
4. Concentration for reuse.

Dilution is of decreasing importance. Pollution control authorities generally prefer the destruction of cyanide rather than its dilution to acceptable levels as outlined above.

The chemical treatment generally comprises the use of chlorine to oxidize the cyanide to cyanate. if required further oxidation and hydrolysis of the cyanate to carbon dioxide, nitrogen and ammonia may be carried out.

Electrolytic treatment is of increasing interest but is expensive in that it requires the operation of quite complicated separate systems. Furthermore, in the prior art the procedure has not been useful for dilute solutions, such as rinse waters without first concentrating them because of low conductivity, which results in poor current efficiency. The prior art has been to add sodium chloride to the cyanide containing waste to improve the conductivity. Clearly this involves an additional expense but, also, it may be that the addition of fairly large quantities of sodium chloride, as required by the prior art, will be frowned upon by pollution control authorities although, at the moment, there is no objection to the feeding of sodium chloride to water courses.

Concentration for reuse is of relatively minor importance. Vacuum evaporation and ion exchange have been used.

SUMMARY OF THE INVENTION

The destruction of the cyanide ion by reaction with the hypochlorite ion is well known. In one valuable aspect of the invention a method of producing hypochlorite ion is provided. The particular advantage in cyanide destruction of hypochlorite addition is that very dilute waste can be treated economically by the hypochlorite.

In its preferred aspects the present invention seeks to provide a method of destroying cyanide in cyanide containing waste liquors, particularly waste liquors produced in electroplating, or to provide a method of producing hypochlorite solution useful in cyanide destruction. The invention permits the electroplater to use the majority of his available capital equipment during its normal "down" time. Most electroplaters do not operate their production lines for 24 hours a day and therefore have substantial equipment-including their D.C. power supplies, plating barrels, pumps, storage and rinse tanks—available for waste treatment. Use of on site production equipment for waste treatment or production of solutions useful in waste treatment eliminates a considerable amount of capital expenditure involved in the electrochemical oxidation of cyanide wastes.

Accordingly, in one aspect, the present invention is a method of conducting an electrolysis comprising tumbling an anode comprising a plurality of electrically conducting particles in an electrolyte while feeding a positive direct current to the particles via an anode feeder connected to a positive direct current supply; maintaining a cathode in electrical contact with the electrolyte, said cathode being spaced from the anode, and applying a negative direct current to the cathode.

In one aspect, the present invention is a method of destroying cyanide in cyanide containing waste liquor comprising tumbling an anode comprising a plurality of electrical conducting particles in the liquor while feeding a positive direct current to the particles via an anode feeder connected to a positive direct current source, maintaining a cathode in electrical contact with the liquor, said cathode being spaced from the anode, and applying a negative direct current to the cathode, whereby the cyanide present is anodically oxidized.

In a preferred embodiment the anode particles are particles of graphite and they are contained in a porous barrel, preferably of a plastic material. The barrel may be formed in two sections, bolted together at a central plane. A hinged or sliding door may be provided to permit the addition and removal of the particles. A plastic barrel, for example, of polymethylmethacrylate, has proved useful.

The cathode may be a metal or graphite sheet inserted into a plastic tank. Alternatively the electrolysis may be carried out in a metal tank which can be used as the cathode. Which ever cathode form is used waste metal can usually be recovered from the cathode by simple scraping at the conclusion of the electrolytic destruction of the cyanide.

Desirably, the anode feeder is a non-rotating graphite cylinder or rod positioned in the liquid and upon which the barrel is rotated. The barrel may be rotated by a belt drive from an electric motor. Typically, the barrel may be rotated at about 8½ revolutions per minute.

It is desirable that the waste liquor be recycled through the tank in which electrolysis is carried out during electrolysis.

It is particularly preferred that the barrel used be a barrel that is normally used for plating. Normally the barrel will be used as a cathode during electroplating but, in the process of the present invention, it will be used as an anode.

In a particularly preferred aspect, the invention provides a method of destroying cyanide in an electroplating solution that comprises collecting counterflow rinse water from a barrel plating counterflow rinse line, at the conclusion of the electroplating immersing a barrel containing a particulate, electrically conducting solid into the rinse water in a tank, circulating the rinse solution through the tank and rotating the barrel to tumble the particulate anode while maintaining electrical contact between the particles and a positive source of direct current, maintaining a cathode spaced from the rotating barrel and applying a negative direct current to that cathode and maintaining the electrolysis until the residual cyanide level is at an acceptable level.

It can be desirable to incorporate sodium chloride into the process in order to develop hypochlorite during the electrolysis and increase the conductivity of the cyanide waste. Similarly at the conclusion of the electrolysis it may be necessary to destroy small or residual amounts of cyanide by adding a hypochlorite solution.

In a desirable aspect the invention is a method of producing a solution of a hypochlorite in which the electrolyte is an alkaline solution of a chloride.

The solution produced may be stored or used immediately for cyanide destruction.

BRIEF DESCRIPTION OF THE DRAWINGS

The invention is illustrated, merely by way of example, in the accompanying drawings in which:

FIG. 1 illustrates a typical three stage counterflow rinse solution in a barrel plating system;

FIG. 2 illustrates an electrolytic oxidation system according to the present invention;

FIGS. 3 and 4 illustrate the apparatus in which the method of the present invention may be carried out in more detail; and FIG. 5 shows results achieved with the apparatus of FIGS. 3 and 4.

DESCRIPTION OF PREFERRED EMBODIMENTS

FIG. 1 illustrates a counterflow rinse system for a barrel plating apparatus. The barrel electroplating is carried out in a first tank 2 and the rinse is carried out by the use of tanks 4, 6 and 8 using a main supply of water at a rate of 60 gallons per hour into the third rinse tank 8. Typical concentrations of the various consituents (in this case the cyanide ion and the copper ion) are shown in the boxes representing the various rinse tanks. As is conventional the electroplating is carried out at alkaline pH, typically sodium hydroxide is used to maintain the alkalinity.

Rinse water is stored in rinse water holding tank 10 throughout all the time that the electroplating is carried out, for example during the day shift in an electroplating plant. It should be noted that there is a flow of approximately 4 gallons per hour between the tanks 2, 4, 6 and 8 and there are evaporations from each of the rinse tanks of about two gallons per hour. The rinse water flow from the first rinse tank 4 to the rinse water holding tank 10 is, as indicated, about 58 gallons per hour.

At the end of the last electroplating shift the rinse water is used in an electrolytic process according to the present invention. That process is illustrated diagrammatically in FIG. 2. In FIG. 2 the same rinse tanks 4, 6 and 8 are shown along with the same rinse water holding tank 10. However, the rinse water tanks 4, 6 and 8 now each contain a barrel, 12, 14 and 16 respectively. These barrels may be the barrels used in the conventional electroplating system or they may be separate barrels specially used for the cyanide electro-oxidation. Each barrel has a positive connnection to a direct current source. Each tank 4, 6 and 8 is shown attached to a negative direct current source. This may be either by a direct link to a metal tank or by the use of a separate cathode, for example a lead cathode, where a plastic tank is used.

As illustrated each of the tanks 12, 14 and 16 contains graphite pellets 18. There are also conduits, generally indicated at 20 in order to pump the rinse water throughout the system. The direction of flow illustrated is from the rinse waste holding tank 10 to the rinse tank 8 through the rinse tank 6 to the rinse tank 4 and back to the rinse water holding tank 10. In addition other cyanide wastes may be fed through the rinse water holding tank 10 through an inlet 22. The effluent from the rinse water holding tank 10 may be discharged to a sewer through an outlet 24. A hypochlorite or sodium chloride solution may be introduced through an inlet 26 in order to assist in the in situ destruction of the cyanide ion. This is shown in a broken lines in FIG. 2 as it is purely optional.

The system of FIG. 2 operates as follows. The plating barrels (or separate barrels) 12, 14 and 16 are partially filled with graphite pellets 18 at the end of the electroplating shift. The barrels are then hoisted into the counterflow rinse tanks 4, 6 and 8. Cyanide rinse water accumulated in rinse water holding tank 10 is recycled through the system using the conduits 20 illustrated. The barrels 12, 14 and 16 are tumbled and operated as anodes for cyanide electro-oxidation. In that electro-oxidation the tank walls are, as indicated, used as the cathode although a separate cathode or cathodes may be provided.

The rinse water is treated overnight or at any other convenient time, preferably during the down time of the electroplating plant. During the cyanide electro-oxidation metal values 28 are plated on the walls of the tanks 4, 6, and 8 as a loosely adherent metal sponge.

When the residual cyanide level is, for example, about 100 parts per million it is destroyed with a small amount of hypochlorite and flushed to the sewer through the outlet 24. At this time the graphite pellets 18 are removed from the plating barrel and stored for subsequent treatment. However, if separate barrels are used just for the cyanide electro-oxidation process then, of course, the pellets may remain in those barrels. Metal sponge 28 adhering to the tanks 4, 6, and 8 is scraped off and recovered.

The rinse tanks 4, 6 and 8 and the barrels 12, 14 and 16 are flushed with water to remove any abraded graphite or metal sponge particles and the barrels 12, 14 and 16 are returned to electroplating tank or to storage. When returned to the electroplating tank the barrels are used as cathodes in the normal barrel electroplating method.

In the illustrated embodiment, particularly in FIG. 1, copper is shown as the ion being plated but the system has given excellent results with alkaline copper, zinc and cadmium cyanide electroplating wastes. In this matter it should be emphasized that spent plating baths other than the electrolytes from barrel electroplating systems can also be used.

FIGS. 3 and 4 illustrate an experimental apparatus equivalent to a rinse tank 4, 6 or 8 containing a barrel 12, 14 or 16 respectively as illustrated in FIG. 2. The system illustrated in FIG. 3 comprises a tank 30 in which the electrolysis is carried out. The tank has an inlet 32 and an outlet 34. There is a barrel 36 positioned within the tank and driven on a centre, fixed anode feeder 38 (see FIG. 4). A positive direct current is fed to the anode feeder 38 via lead 40 which connects with a copper lug 42 attached to a graphite bus bar 44. It will be appreciated that the materials used are unimportant. It is merely necessary that they be electrically conducting and as corrosion-resistant as possible. The feed from the bus bar 44 to the anode feeder 38 is through a bar not shown but contained within the insulating coating 46. The coating 46 may, for example, be of a silicone rubber.

The barrel is rotated upon the anode feeder 38 by a belt 48 engaging on a pulley 50 attached to the barrel. At its other end the drive is through a pulley system generally indicated at 52 via a belt 54 from an electric motor 56. The drive system is mounted on a bench 58.

There is a cathode 60 positioned within the tank 30, there is a bus bar and contact system generally indicated at 62 to provide a negative supply of direct current to the cathode 60. As illustrated in the drawing-particularly FIG. 4-the barrel 36 is formed in two parts held together at flanges 64 by bolts 66. Although not shown in the drawings the barrel 36 is porous so that the rinse water electrolyte can pass through it.

Using the apparatus illustrated in FIGS. 3 and 4 experimental results were achieved indicating the value of the present invention. The barrel illustrated in FIGS. 4 was supplied with 3,100 graphite pellets 4.9 millimeters in diameter and 4.9 millimeters long. A lead plate 14 × 23 centimeters was used as a cathode 60. The tank 30 was of polymethylmethacrylate. A stationary graphite centre shaft 38 was connected to the graphite bus bars 44 via the conducting rods protected by the insulator 46. The barrel was tumbled at 8.5 revolutions per minute through the drive from the electric motor 56. Six liters of simulated cyanide plating rinse water were pumped through the barrel 36 in a recycle system through the inlet 32 and from the outlet 34 to storage, back through the inlet 32 through the tank 30 and out through outlet 34. Direct current was applied to the system as illustrated in FIG. 3. 50 milliliter aliquots of electrolyte were removed periodically from the cyanide waste holding tank for chemical anaylsis. No attempt was made to maintain constant temperature in the test system and losses due to evaporation were not compensated. Cyanide was analyzed as the total cyanide using the well known distillation-silver nitrate titration method. Metal analysis was carried out using atomic absorption. Calibration standards were prepared from the starting effluent solutions.

After electrolysis of the rinse water to the desired cyanide level the lead cathode 60 was removed from the tank 30 and scraped with a spatula to simulate industrial recycling. The recovered metal was then dissolved in nitric acid to determine its lead content.

A series of results were obtained with simulated zinc cyanide plating wastes, simulated copper cyanide plating wastes and simulated cadmium cyanide plating waste. The results and conditions of the experiments were as follows. The results are plotted, in part, on FIG. 5. Applied voltages were in the range 12 to 18 volts.

ZINC CYANIDE TREATMENT

Table 1 sets out electrolysis conditions and treatment efficiency for electrolysis of a simulated zinc cyanide plating waste. Interpolation of this data shows that zinc cyanide wastes of 4000 to 1000 ppm cyanide concentration are treatable to 50 ppm residual cyanide- see FIG. 5. Zinc recovery is greater than 99% to > 25 ppm zinc at 50 ppm cyanide residual.

COPPER CYANIDE TREATMENT

Table 2 sets out electrolysis conditions and treatment efficiency for electrolysis of a simulated copper cyanide plating waste. Interpolation of this data indicates that copper cyanide wastes of 4000 to 1000 ppm cyanide concentration are treatable to 50 ppm cyanide residual - see FIG. 5. Copper recovery is greater than 91% to ≦ 300 ppm at 50 ppm cyanide residual.

CADMIUM CYANIDE TREATMENT

Table 3 sets out electrolysis conditions and treatment efficiency for electrolysis of a simulated cadmium plating waste. Interpolation of this data indicates that cadmium cyanide wastes of 4000 to 1000 ppm cyanide concentration are treatable to 50 ppm cyanide residual. Cadmium recovery is greater than 96% to - 50 ppm at 50 ppm cyanide residual.

TABLE 1
ELECTROLYSIS OF ZINC CYANIDE WASTE

| Cell Description | - anode current feeder - graphite rod |
| --- | --- |
| | - anodes 3100 4.9 mm × 4.9 mm graphite pellets |
| | - cathode - lead sheet 14 cm × 23 cm |
| Operating Mode | - recycle flow rate - 780 ml/min |
| | - barrel rpm - 8.5 |
| | - anode current density (C.D.) - 10 mamp/cm$^2$ |
| | - cathode C.D. - 99 mamp/cm |
| Test Solution | - 6 liters deionized water containing 48 g NaOH |
| | - 57 g tech. grade NaCN, 18.7 g ZnO |

RESULTS

| Time (min) | 0 | 30 | 60 | 120 | 185 | 240 |
| --- | --- | --- | --- | --- | --- | --- |
| Current (amp) | 32 | 32 | 32 | 32 | 32 | 32 |
| Average retention time (min) | 3.85 | | | | | |
| Temp. ° C | 64 | 74 | 74 | 75 | 75 | 75 |
| Electrolyte volume (l) | 5.9 | 5.6 | 5.3 | 4.7 | 3.5 | 3.0 |
| pH | 12.7 | | | | | 12.7 |
| ppm Cyanide | 4576 | 3640 | 2808 | 1014 | 182 | 13 |
| ppm Zinc | 2500 | 2080 | 1280 | 350 | 54 | 12 |

TABLE 2
ELECTROLYSIS OF COPPER CYANIDE WASTE

| Cell Description | - anode current feeder - graphite rod |
| --- | --- |
| | - anodes - 3100 4.9 mm × 4.9 mm graphite pellets |
| | - cathode - lead sheet 14 cm × 23 cm |
| Operating Mode | - recycle flow rate 780 ml/min |
| | - barrel rpm - 8.5 |
| | - anode C.D. - 10 mamp/cm$^2$ |
| | - cathode C.D. - 99 mamp/cm$^2$ |
| Test Solution | - 6 liters deionized water containing 21.6 g copper powder, 72.6 g KCN, 12.7 g KOH |

RESULTS

| Time (min) | 0 | 60 | 120 | 190 |
| --- | --- | --- | --- | --- |
| Current (amps) | 32 | 32 | 32 | 32 |
| Average retention time (min) | 3.85 | | | |
| Temp. ° C | 74 | 89 | 89 | 91 |
| Electrolyte Volume (l) | 5.95 | 5.0 | 3.9 | 2.9 |
| pH | 12.6 | 12.6 | 10.1 | 9.7 |
| ppm Cyanide | 4576 | 1959 | 29 | 3.6 |
| ppm Copper | 3600 | 1550 | 216 | 4 |

TABLE 3
ELECTROLYSIS OF CADMIUM CYANIDE WASTE

| Cell Description | - anode current feeder - graphite rod |
| --- | --- |
| | - anodes - 3100 4.9 mm × 4.9 mm graphite pellets |
| | - cathode - lead sheet 14 cm × |

TABLE 3-continued

| | |
|---|---|
| Operating Mode | - 23 cm<br>- recycle flow rate - 780 ml/min<br>- barrel rpm - 8.5<br>- anode C.D. - 9.4 mamp/cm$^2$<br>- cathode C.D. - 99 mamp/cm$^2$ |
| Test Solution | - 6 liters deionized water containing 10.2 g CdO, 34.2 g. tech. grade NaCN, 6.4 g NaOH. |

RESULTS

| | | | | |
|---|---|---|---|---|
| Time (min) | 0 | 60 | 105 | 165 |
| Current (amp) | 26 | 30 | 30 | 30 |
| Average retention time (min) | 3.85 | | | |
| Temp. °C | 67 | 95 | 95 | 98 |
| Electrolyte volume (1) | 5.9 | 4.8 | 3.8 | 2.5 |
| pH | 12.5 | 11.9 | 9.9 | 9.7 |
| ppm Cyanide | 2800 | 218 | 12.9 | 1.3 |
| ppm Cadmium | 1490 | 300 | 5.0 | 3.9 |

SODIUM CYANIDE TREATMENT

Tables 4 and 5 set out electrolysis conditions and treatment efficiency for a sodium cyanide waste at 10 mamp/cm$^2$, 15 mamp/cm$^2$ anode current densities respectively. This data was produced to establish a baseline for comparison of plating waste treatment data.

TABLE 4
ELECTROLYSIS OF SODIUM CYANIDE WASTE

| | |
|---|---|
| Cell Description | - anode current feeder - graphite rod<br>- anodes - 3100 4.9 mm × 4.9 mm graphite pellets<br>- cathode - lead sheet 14 cm × 23 cm |
| Operating Mode | - recycle flow rate - 780 ml/min<br>- barrel rpm - 8.5<br>- anode C.D. - 10 mamp/cm$^2$<br>- cathode C.D. - 99 mamp/cm$^2$ |
| Test Solution | - 6 liters deionized water containing 48 g NaOH, 62 g tech. grade NaCN |

RESULTS

| | | | | | | | |
|---|---|---|---|---|---|---|---|
| Time (min) | 0 | 30 | 60 | 90 | 120 | 150 | 205 |
| Current (amp) | 32 | 32 | 32 | 32 | 32 | 32 | 32 |
| Average retention time (min) | 3.85 | | | | | | |
| Temp. °C | 50° C | 72 | 73 | 73 | 73 | 73 | 73 |
| pH | 13.0 | | | | | | 13.0 |
| ppm Cyanide | 5400 | 3900 | 2700 | 1650 | 790 | 270 | 15 |

TABLE 5
ELECTROLYSIS OF SODIUM CYANIDE WASTE

| | |
|---|---|
| Cell Description | - anode current feeder - graphite rod<br>- anodes - 3100 4.9 mm × 4.9 mm graphite pellets<br>- cathode - lead sheet 14 cm × 23 cm |
| Operating Mode | - recycle flow rate - 780 ml/min<br>- barrel rpm - 8.5<br>- anode C.D. - 15 mamp/cm$^2$<br>- cathode C.D. - 149 mamp/cm$^2$ |
| Test Solution | - 6 liters deionized water containing 48 g NaOH, 61 g NaCN tech. grade |

RESULTS

| | | | | | |
|---|---|---|---|---|---|
| Time (min) | 0 | 30 | 60 | 90 | 120 |
| Current (amp) | 45 | 48 | 48 | 48 | 48 |
| Average retention time (min) | 3.85 | | | | |
| Temp. °C | 49 | 85 | 91 | 91 | 91 |
| pH | 12.8 | | | | 12.8 |
| ppm Cyanide | 4800 | 3150 | 1500 | 470 | 47 |
| Electrolyte volume (1) | 5.95 | 5.9 | 4.9 | 3.9 | 3.0 |

METAL RECOVERY DURING PLATING WASTE TREATMENT

Cadmium and zinc were easily scraped from the lead cathode as a wet powder. Some non-powdery cadmium and zinc remained attached to the lead cathode and could not be removed by scraping. Copper was more difficult to scrape.

All scraped metals were of high purity as follows:
Copper = 97%
Zinc = 96%
Cadmium = 97%

The metals all contained a small amount of nitric acid insoluble material (probably graphite).

The present invention thus offers a complete program for treatment of virtually any cyanide waste, each method of treatment has its own advantages, for example the production of an initial hypochlorite solution has the advantage that very dilute cyanide containing waste may be treated.

I claim:

1. A method of destroying cyanide in cyanide containing waste liquor comprising tumbling an anode comprising a plurality of electrically conducting particles in the liquor while feeding a positive direct current to the particles via an anode feeder connected to a positive direct current source;
    maintaining a cathode in electrical contact with the liquid, said cathode being spaced from the anode, and applying a negative direct current to the cathode, whereby the cyanide present is anodically oxidized.

2. A method as claimed in claim 1 in which the anode particles are graphite.

3. A method as claimed in claim 1 in which the particles are contained in a porous barrel.

4. A method as claimed in claim 3 in which the barrel is of a plastic material.

5. A method as claimed in claim 4 in which the plastic is polymethylmethacrylate.

6. A method as claimed in claim 4 in which the anode feeder is a nonrotating graphite cylinder positioned in the liquid and upon which the barrel is rotated.

7. A method as claimed in claim 6 in which the barrel is rotated by a belt drive from an electric motor.

8. A method as claimed in claim 7 in which the barrel rotates at about 8.5 r.p.m.

9. A method as claimed in claim 2 in which the cathode is a lead sheet.

10. A method as claimed in claim 2 carried out in a metal tank which is used as the cathode.

11. A method as claimed in claim 2 in which waste liquor is recycled.

12. A method as claimed in claim 2 in which the method is carried out in a barrel normally used for plating.

13. A method of destroying cyanide in an electroplating solution comprising collecting counterflow rinse water from a barrel electroplating system;
    at the conclusion of the electroplating immersing a barrel containing a particulate, electrically conducting solid into the rinse solution in a tank, circulating the rinse solution through the tank and rotating the barrel to tumble the particulate anode while maintaining electrical contact between the particles and a positive source of direct current;
    maintaining a cathode spaced from the rotating barrel and applying a negative direct current to that cathode,
    maintaining the electrolysis until the residual cyanide level is at an acceptable level.

14. A method as claimed in claim 13 in which the barrel filled with particulate material is the barrel used in the barrel electroplating system.

15. A method as claimed in claim 13 in which any metal sponge adhering to the cathode after the destruction of the cyanide is removed from the cathode.

16. A method as claimed in claim 13 in which the residual cyanide left after the electrolysis is destroyed by adding a solution of hypochlorite.

17. A method as claimed in claim 13 including adding an inorganic chloride to the rinse solution to assist in the cyanide destruction by in situ production of hypochlorite.

18. A method as claimed in claim 13 in which the particulate electrode comprises a plurality of graphite pellets in contact with a nonrotating centre anode feeder about which the barrel is rotated.